(12) United States Patent
Chon

(10) Patent No.: US 12,454,187 B2
(45) Date of Patent: Oct. 28, 2025

(54) VEHICLE AND CONTROL METHOD FOR EXECUTING A POWER SAVING MODE

(71) Applicants: Hyundai Motor Company, Seoul (KR); Kia Corporation, Seoul (KR)

(72) Inventor: Un Chon, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 189 days.

(21) Appl. No.: 18/237,750

(22) Filed: Aug. 24, 2023

(65) Prior Publication Data

US 2024/0149704 A1    May 9, 2024

(30) Foreign Application Priority Data

Nov. 4, 2022  (KR) .......................... 10-2022-0146314

(51) Int. Cl.
| | |
|---|---|
| *B60L 15/20* | (2006.01) |
| *B60L 1/00* | (2006.01) |
| *B60L 58/10* | (2019.01) |

(52) U.S. Cl.
CPC ............ *B60L 15/2045* (2013.01); *B60L 1/00* (2013.01); *B60L 58/10* (2019.02); *B60L 2240/12* (2013.01); *B60L 2260/52* (2013.01)

(58) Field of Classification Search
None
See application file for complete search history.

(56) References Cited

U.S. PATENT DOCUMENTS

| | | | |
|---|---|---|---|
| 9,517,705 B1* | 12/2016 | Liu | B60L 15/2045 |
| 10,377,389 B2* | 8/2019 | Bryan | B60L 1/02 |
| 11,312,243 B2* | 4/2022 | Cho | B60L 15/2045 |
| 11,814,032 B2* | 11/2023 | Poll | B60L 50/60 |
| 12,263,737 B2* | 4/2025 | Kresse, III | B60W 20/40 |
| 2021/0354587 A1* | 11/2021 | Imura | B60L 1/00 |

* cited by examiner

*Primary Examiner* — Todd Melton
(74) *Attorney, Agent, or Firm* — Morgan Lewis & Bockius LLP

(57) ABSTRACT

A vehicle control method includes receiving information on a state of a main battery from a battery controller to a power controller so that a vehicle operates in a power saving mode, receiving, by the power controller, information on a possible travel distance of the vehicle determined by a drive controller using information on a charge amount of the main battery, receiving information on a determination that the vehicle cannot travel to a destination from the drive controller to the power controller using information on a remaining travel distance to the destination, and executing, by the power controller, the power saving mode depending on a level according to the information on the determination that the vehicle cannot travel to a destination.

17 Claims, 10 Drawing Sheets

VEHICLE AND CONTROL METHOD FOR EXECUTING A POWER SAVING MODE

CROSS-REFERENCE TO RELATED APPLICATION(S)

The present application claims priority to Korean Patent Application No. 10-2022-0146314, filed on Nov. 4, 2022, the entire contents of which is incorporated herein for all purposes by this reference.

BACKGROUND OF THE PRESENT DISCLOSURE

Field of the Present Disclosure

The present disclosure relates to a vehicle and a control method thereof, and more particularly, to a vehicle capable of executing a power saving mode depending on power of a main battery for driving an electric vehicle and a control method thereof.

Description of Related Art

Eco-friendly vehicles are classified into electric vehicles, hybrid vehicles, plug-in vehicles, and fuel cell vehicles. Such an eco-friendly vehicle drives using an electric motor, and a main battery for supplying power to the electric motor is provided thereon.

In the case of an electric vehicle, a distance that the vehicle may travel in a state in which the main battery is fully charged is determined, and it is not easy to charge the main battery even when the charging capacity of the main battery is insufficient while traveling. Therefore, it is necessary to efficiently manage power charged in the main battery in the electric vehicle.

Moreover, it takes a relatively long time to charge the main battery compared to an internal combustion engine vehicle, and because there are not many charging stations capable of charging the main battery, driving of the electric vehicle may no longer be possible when the main battery is discharged.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for performing a power saving mode to increase a traveling distance depending on a charged state of a main battery for driving an electric vehicle, and a control method thereof.

Additional aspects of the present disclosure will be set forth in part in the description which follows, and in part, will be obvious from the description, or may be learned by practice of the present disclosure.

In accordance with an aspect of the present disclosure, a vehicle control method includes receiving information on a state of a main battery from a battery controller to a power controller so that a vehicle operates in a power saving mode, receiving, by the power controller, information on a possible travel distance of the vehicle determined by a drive controller using information on a charge amount of the main battery, receiving information on a determination that the vehicle cannot travel to a destination from the drive controller to the power controller using information on a remaining travel distance to the destination, and executing, by the power controller, the power saving mode depending on a level according to the information on the determination that the vehicle cannot travel to a destination.

The level of the power saving mode may be executed to limit power of an electronic convenience device included in the vehicle.

The electronic convenience device may be a device unrelated to driving and braking of the vehicle.

The level of the power saving mode may include power saving intensity level 1 for limiting power by setting power consumption of the electronic convenience device to a predetermined value, power saving intensity level 2 for cutting off the power consumption of the electronic convenience device, and power saving intensity level 3 for monitoring the charge amount of the main battery and controlling driving of the vehicle depending on the charge amount of the main battery.

Power saving intensity level 1 may begin when the possible travel distance of the vehicle is within a predetermined range, and be maintained when the possible travel distance of the vehicle decreases to a predetermined range while the main battery is being discharged or when the possible travel distance of the vehicle increases to a predetermined range while the main battery is being charged.

Power saving intensity level 2 may begin when the possible travel distance of the vehicle decreases to a predetermined range or more while the main battery is being discharged.

Power saving intensity level 2 may begin when the possible travel distance of the vehicle is within a predetermined range, and be maintained when the possible travel distance of the vehicle decreases to a predetermined range while the main battery is being discharged or when the possible travel distance of the vehicle increases to a predetermined range while the main battery is being charged.

Power saving intensity level 3 may begin when the possible travel distance of the vehicle is within a predetermined range, and be maintained when the possible travel distance of the vehicle decreases to a predetermined range or more while the main battery is being discharged.

A cooperative control may be performed while power saving intensity level 2 is maintained, and in the cooperative control, a cooperative control target device consuming relatively little power among the electronic convenience devices may be operated.

The cooperative control may be stopped when the cooperative control target device is manually operated.

In power saving intensity level 3, the cooperative control may be performed depending on the charge amount of the main battery.

The power saving mode may be released when the electronic convenience device is manually operated while one of the power saving intensity level 1 and the power saving intensity level 2 is being executed.

In power saving intensity level 3, a vehicle speed may be limited when the charge amount of the main battery decreases to a predetermined range or less.

In accordance with another aspect of the present disclosure, a vehicle includes an input and output device including navigation information and through which information is input or output by a user, a battery controller configured to control a main battery provided to supply power to the vehicle, a drive controller configured to control driving of the vehicle and determine a possible travel distance using information on a charge amount of the main battery and travel distance information, and a power controller configured to execute a power saving mode for controlling power consumed by an electronic convenience device included in the vehicle depending on a level using the possible travel distance.

The level of the power saving mode may include power saving intensity level 1 for limiting power by setting power consumption of the electronic convenience device to a predetermined value, power saving intensity level 2 for cutting off the power consumption of the electronic convenience device, and power saving intensity level 3 for monitoring the charge amount of the main battery and controlling driving of the vehicle depending on the charge amount of the main battery.

Power saving intensity level 1 may begin when the possible travel distance of the vehicle is within a predetermined range, and be maintained when the possible travel distance of the vehicle decreases to a predetermined range while the main battery is being discharged or when the possible travel distance of the vehicle increases to a predetermined range while the main battery is being charged.

Power saving intensity level 2 may begin when the possible travel distance of the vehicle is within a predetermined range, and be maintained when the possible travel distance of the vehicle decreases to a predetermined range while the main battery is being discharged or when the possible travel distance of the vehicle increases to a predetermined range while the main battery is being charged.

A cooperative control may be performed while power saving intensity level 2 is maintained, and in the cooperative control, a cooperative control target device consuming relatively little power among the electronic convenience devices may be operated.

The power saving mode may be released when the electronic convenience device is manually operated while one of the power saving intensity level 1 and the power saving intensity level 2 is being executed.

In power saving intensity level 3, a vehicle speed may be limited when the charge amount of the main battery decreases to a predetermined range or less.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
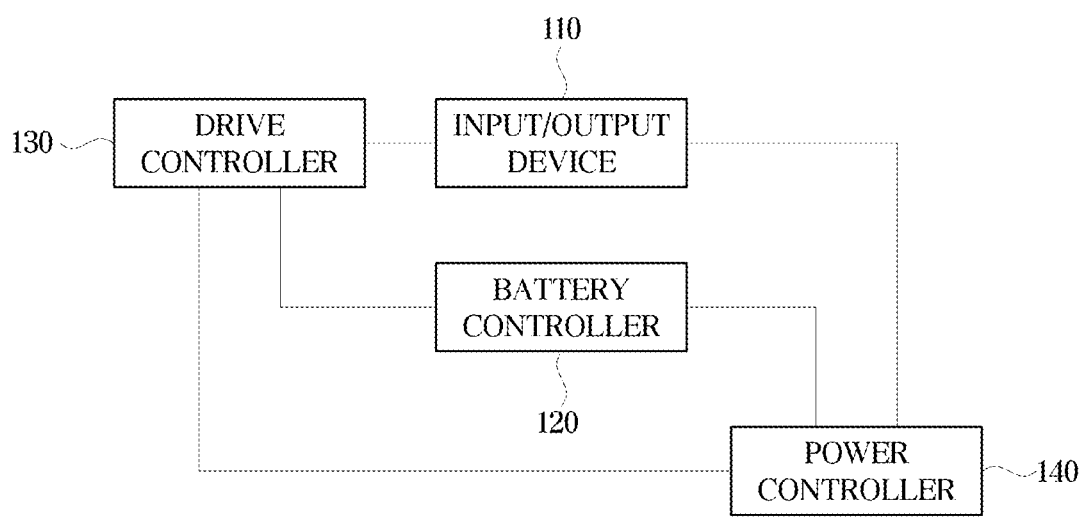
FIG. 1 is a diagram illustrating a configuration of a power saving control apparatus of a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings. The exemplary embodiments described below are provided by way of example so that those skilled in the art will be able to fully understand the spirit of the present disclosure. The present disclosure is not limited to the exemplary embodiments described below, but may be embodied in other forms. To clearly explain the present disclosure, parts not related to the description are omitted from the drawings, and the width, length, thickness, etc. of the components may be exaggerated for convenience. Throughout the specification, like reference numbers indicate like elements.

Referring to FIG. 1, FIG. 2, FIG. 3, FIG. 4, FIG. 5, FIG. 6, FIG. 7, and FIG. 8, a power saving control apparatus of a vehicle according to an exemplary embodiment of the present disclosure is operated to optimize power use of a main battery configured for supplying driving power to a vehicle driven by an electric motor, such as an electric vehicle. The power saving control apparatus of the vehicle includes an input and output device 110, a battery controller 120, a drive controller 130, and a power controller 140.

The input and output device 110 is provided inside the vehicle and may be disposed on a center fascia of the vehicle so that a user may input information or commands or check displayed contents. The input and output device 110 may allow the user to control various electronic devices provided in the vehicle and may display a variety of information related to the vehicle.

The input and output device 110 may be Audio Video, Navigation Telematics (AVNT) or an instrument panel such as a cluster.

Furthermore, the input and output device 110 may include navigation, and for the present purpose, the input and output device 110 may include information on a route on which the vehicle travels and information on a map.

The battery controller 120 may be configured for controlling an operation of the main battery for supplying power to an electric motor for driving the vehicle, control charging and discharging of the main battery, and obtain information on a charge amount of the main battery. Furthermore, the battery controller 120 may obtain information on a charged state and a discharged state of the main battery.

The drive controller 130 may operate and control the electric motor for driving the vehicle, and determine or correct a possible travel distance (DTE; distance to empty) of the vehicle. Furthermore, the drive controller 130 may be configured to determine whether it is possible for the vehicle to travel to a destination by receiving information on a travel distance received through the input and output device 110 and a remaining travel distance to a destination and comparing the received information with information on the possible travel distance.

The power controller 140 may be configured for controlling various electronic devices included in the vehicle and control whether electronic convenience devices operate. Furthermore, the power controller 140 may adjust an amount of power to be supplied to various electronic devices. Accordingly, the power controller 140 may be configured for controlling the amount of power to be supplied to the electronic devices, such as reducing or increasing the power to be consumed in the vehicle.

In the exemplary embodiment of the present disclosure, the power controller 140 may be configured for controlling the vehicle to operate in a power saving mode using information on the possible travel distance of the vehicle and information on whether it is possible for the vehicle to travel to the destination, and may be configured to determine and control a power saving intensity level.

When receiving information on whether it is possible for the vehicle to travel to the destination through the drive controller 130 and receiving information on a determination that it is impossible for the vehicle to travel to the destination, the power controller 140 is configured to determine the power saving intensity level using the information on the possible travel distance of the vehicle. The power saving intensity level may be divided into levels 1 to 3, and this may be added or decreased as needed.

The power saving mode may be executed when power for driving the vehicle to a destination is insufficient through driving information of the vehicle, and it may be determined to be executed as power saving intensity level 1 when a possible travel distance is within a predetermined range.

Power saving intensity level 1 may begin, for example, when the possible travel distance is in a range of 120 km to 150 km, and power for the electronic convenience devices, which are electronic equipment unrelated to driving and braking of the vehicle, may be limited to about 50% at maximum. The electronic convenience devices may be electronic devices such as air conditioning and heating devices, seat manipulation devices, electronic door devices, and lighting devices.

Figure 2:
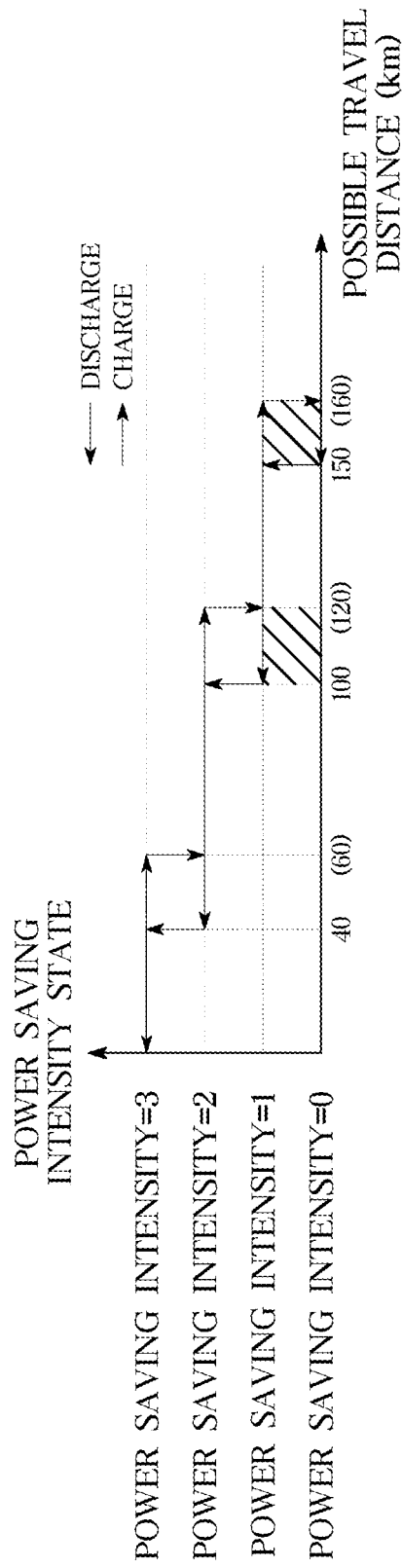
FIG. 2 is a diagram for explaining determination of execution and release of power saving intensity level 1 in the power saving control apparatus of the vehicle according to an exemplary embodiment of the present disclosure.

As illustrated in FIG. 2, power saving intensity level 1 may begin when the possible travel distance is within a predetermined range (e.g., in the range of 120 km to 150 km) regardless of whether the main battery is charged or discharged. Furthermore, when the possible travel distance decreases to a predetermined range (e.g., in a range of 100 km to 120 km) while the main battery is being discharged, power saving intensity level 1 may be maintained.

However, power saving intensity level 1 may be released when the possible travel distance decreases to a predetermined range or more (e.g., less than 100 km) while the main battery is being discharged, and in the present way, when the possible travel distance decreases to the predetermined range or more than the predetermined range, power saving intensity level 2 may begin.

Power saving intensity level 1 may be maintained when the possible travel distance increases to the predetermined range (e.g., 150 km to 160 km) while the main battery is being charged, power saving intensity level 1 may be released when the possible travel distance increases to a predetermined range or more (e.g., 160 km or more) while the main battery is being charged, and in the present way, the power saving mode may be released when the possible travel distance increases to the predetermined range or more than the predetermined range.

Herein, the possible travel distance may change as power saving intensity level 1 progresses, and thus to prevent repeated execution and release of the power saving mode or prevent repetition of user guidance for the execution and release of the power saving mode as the possible travel distance changes, a hysteresis section is set so that power saving intensity level 1 is maintained when the possible travel distance decreases to the predetermined range or increases to the predetermined range while the main battery is being discharged or charged. Hatched portions in FIG. 2 are the hysteresis sections.

In power saving intensity level 1, power consumption of the electronic convenience devices, which are electronic equipment unrelated to driving and braking of the vehicle, is limited to be 50% at maximum. For example, when the power consumption of the electronic convenience devices is about 10 kW, the power consumption may be limited to a range of 5 kW to 9.5 kW.

Figure 3:
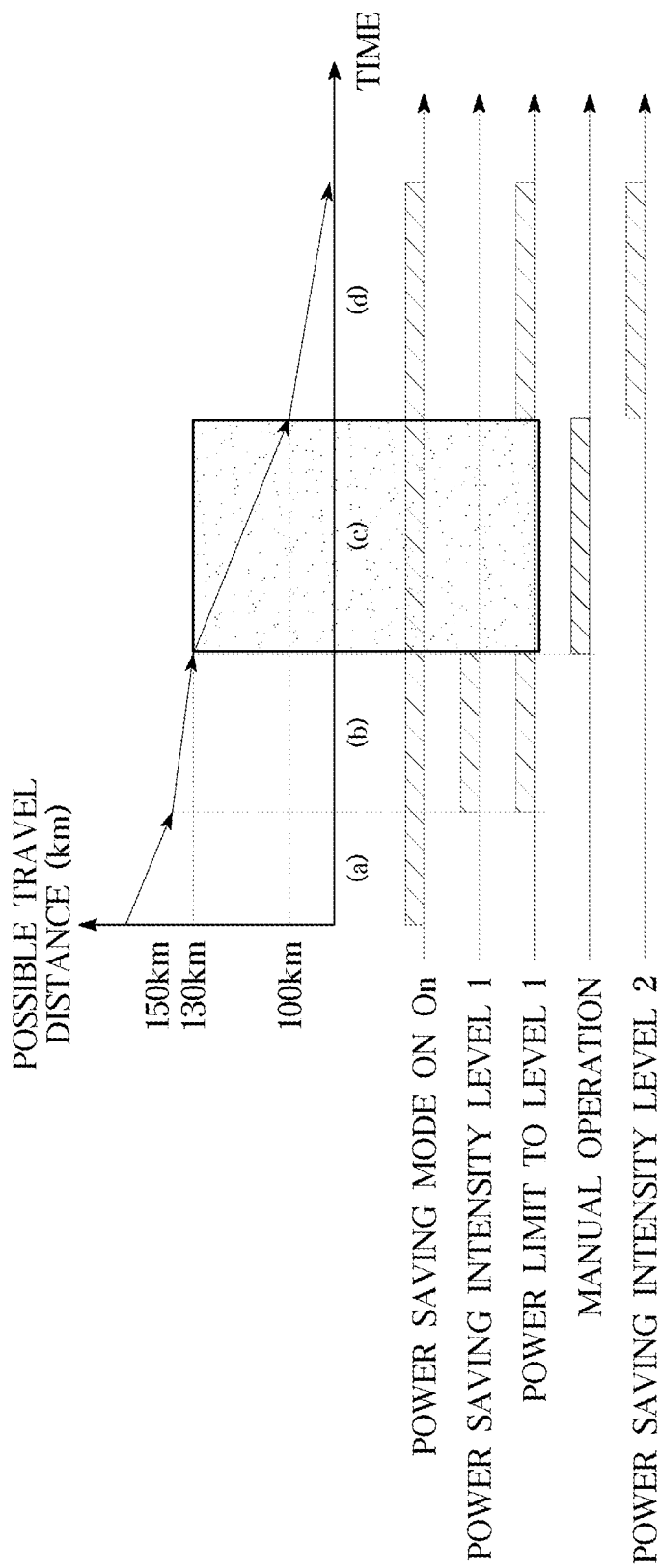
FIG. 3 is a diagram for explaining power control in power saving intensity level 1 in the power saving control apparatus of the vehicle according to an exemplary embodiment of the present disclosure.

In the instant case, as illustrated in FIG. 3, power saving intensity level 1 is maintained in sections (b) and (c) in FIG. 3 while the main battery is being discharged, but when the user manually operates the electronic convenience devices, power saving intensity level 1 may be released. That is, power saving intensity level 1 proceeds from the section (b) in FIG. 3, but when the user manually operates the electronic convenience devices, power saving intensity level 1 is released in the section (c) in FIG. 3 and the power saving mode is released. Accordingly, the amount of power for the electronic convenience devices may not be limited in the section (c) in FIG. 3.

The power controller 140 is configured to control so that power saving intensity level 2 begins when the main battery is discharged and the possible travel distance decreases to the predetermined range or more than the predetermined range (e.g., less than 100 km). That is, when the user manually operates the electronic convenience devices, the power saving mode is released, and when a condition for beginning power saving intensity level 2 is satisfied, power saving intensity level 2 may begin immediately.

Figure 4:
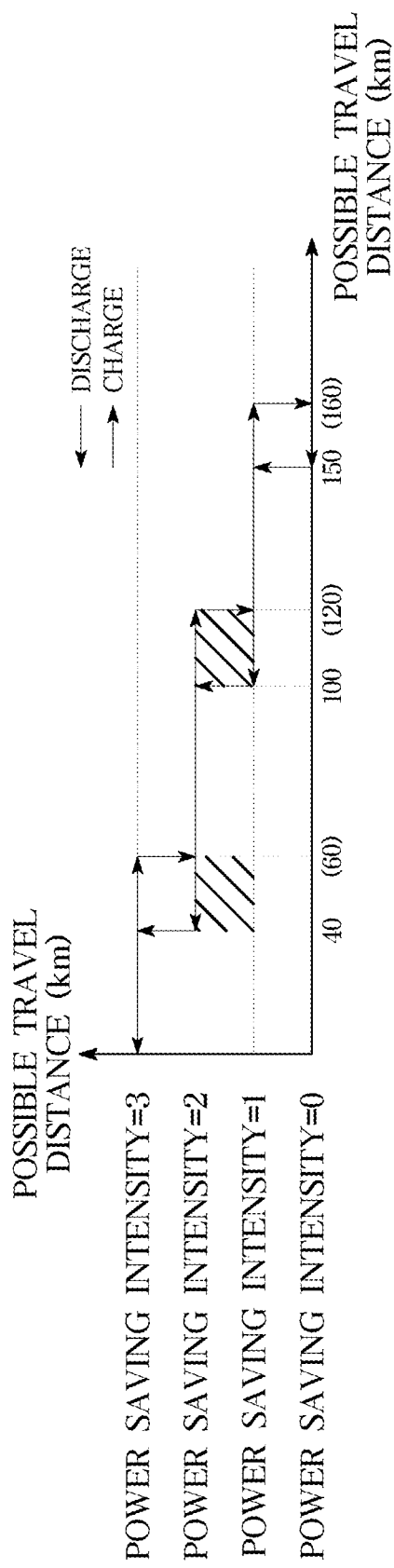
FIG. 4 is a diagram for explaining determination of execution and release of power saving intensity level 2 in the power saving control apparatus of the vehicle according to an exemplary embodiment of the present disclosure.

As illustrated in FIG. 4, power saving intensity level 2 may begin when the possible travel distance is within a predetermined range (e.g., 60 km to 100 km) regardless of whether the main battery is being charged or discharged. Furthermore, when the possible travel distance decreases to a predetermined range (e.g., 40 km to 60 km) while the main battery is being discharged, power saving intensity level 2 may be maintained.

However, when the possible travel distance decreases to a predetermined range or more less than 40 km) while the main battery is being discharged, power saving intensity level 2 may be released, and in the present way, when the possible travel distance decreases to the predetermined range, power saving intensity level 3 may begin.

Power saving intensity level 2 may be maintained when the possible travel distance increases to the predetermined range (e.g., 100 km to 12.0 km) while the main battery is being charged, power saving intensity level 2 may be released when the possible travel distance increases to the predetermined range or more (e.g., 120 km or more) while the main battery is being charged, and in the present way, power saving intensity level 1 may begin when the possible travel distance increases to the predetermined range or more.

Herein, the possible travel distance may change as power saving intensity level 2 progresses, and thus to prevent the power saving intensity level from changing to level 1 or level 3 or prevent repetition of user guidance for the change of the power saving intensity level as the possible travel distance changes, a hysteresis section is set so that power saving intensity level 2 is maintained when the possible travel distance decreases to the predetermined range or increases to the predetermined range while the main battery is being discharged or charged. Hatched portions in FIG. 4 are the hysteresis sections.

In power saving intensity level 2, power consumption of the electronic convenience devices unrelated to driving and braking of the vehicle is limited to be 100% at maximum. For example, when the power consumption of the electronic convenience devices is about 10 kW, the power consumption may be limited to a range of 0.5 kW to 5 kW.

Figure 5:
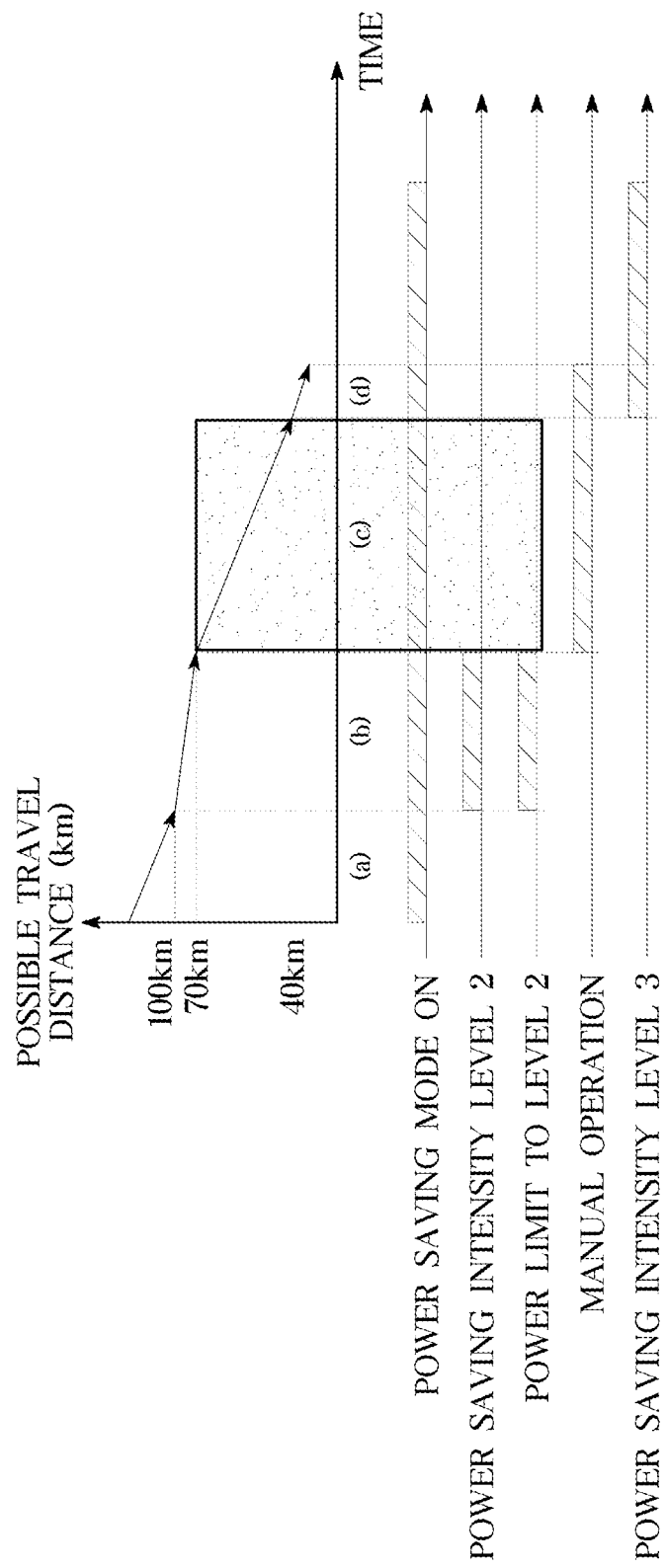
FIG. 5 is a diagram for explaining power control in power saving intensity level 2 in the power saving control apparatus of the vehicle according to an exemplary embodiment of the present disclosure.

In the instant case, as illustrated in FIG. 5, power saving intensity level 2 is maintained in sections (b) and (c) in FIG. 5 while the main battery is being discharged, but when the user manually operates the electronic convenience devices, power saving intensity level 2 may be released. That is, power saving intensity level 2 proceeds from the section (b) in FIG. 5, the when the user manually operates the electronic convenience devices, power saving intensity level 2 is released in the section (c) in FIG. 5 and the power saving mode is released. Accordingly, the amount of power for the electronic convenience devices may not be limited in the section (c) in FIG. 5.

The power controller 140 is configured to control so that power saving intensity level 3 begins when the main battery is discharged and the possible travel distance decreases to the predetermined range or more (e.g., less than 40 km). That is, when the user manually operates the electronic convenience devices, the power saving mode is released, and when a condition for beginning power saving intensity level 3 is satisfied, power saving intensity level 3 may begin immediately.

Figure 6:
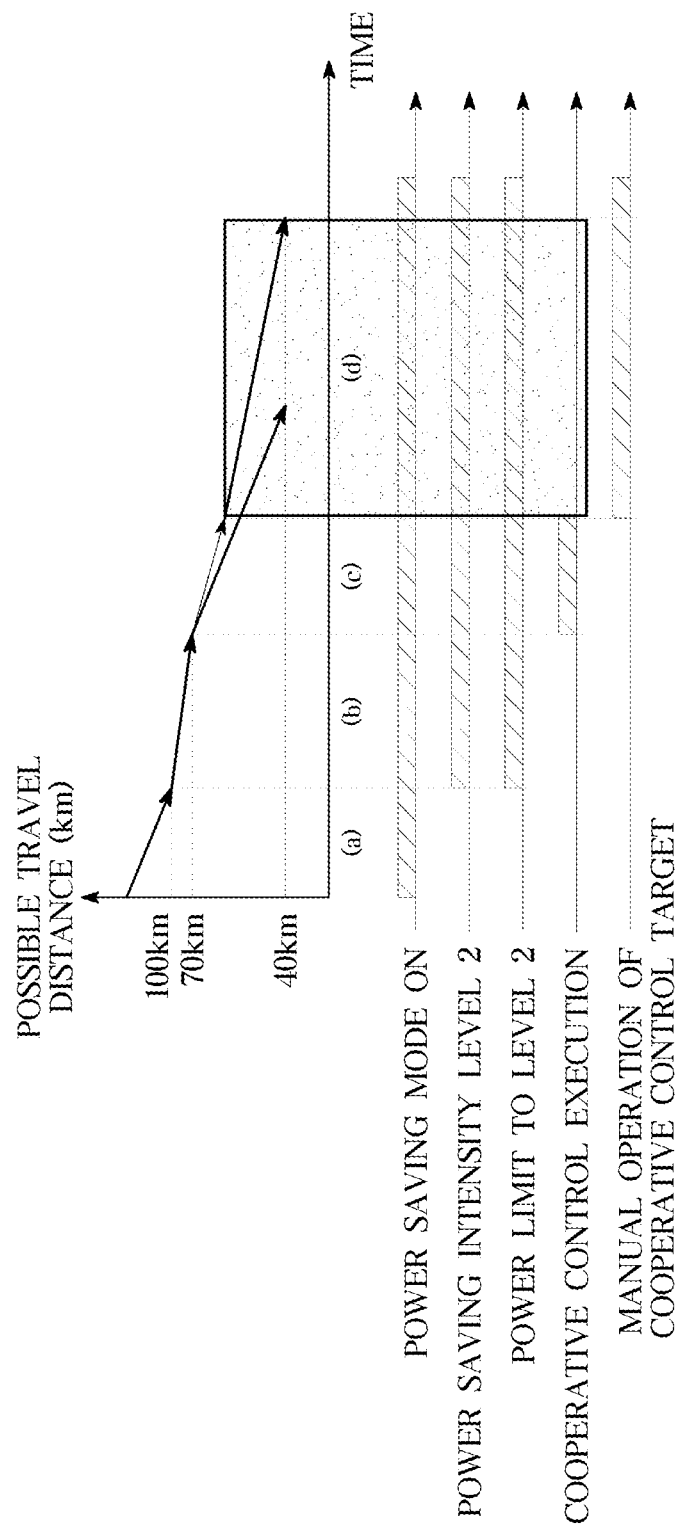
FIG. 6 is a diagram for explaining performance of power control and cooperative control in power saving intensity level 2 in the power saving control apparatus of the vehicle according to an exemplary embodiment of the present disclosure.

As illustrated in FIG. 6, as needed, cooperative control may be performed in power saving intensity level 2. The cooperative control is a control that allows the electronic convenience devices that consume relatively less power to operate because inconvenience is caused to the user using the vehicle when the amount of power consumed by the electronic convenience devices is limited to 80% or more. The present cooperative control may be controlled by the power controller 140, and cooperative control target devices may be some of the electronic convenience devices included in the vehicle, may be selected based on power consumption, and may be electronic convenience devices having relatively low power consumption.

For example, the power controller 140 may increase a temperature of a seat heating wire or a steering wheel heating wire with low power consumption instead of cutting off power supply to a fan heater, and may increase a speed of a motor of a ventilation seat instead of cutting off power supply to a compressor of an air conditioner.

That is, power saving intensity level 2 is performed in sections (b) to (d) in FIG. 6, but the power controller 140 may be configured for controlling so that the cooperative control is performed when the possible travel distance decreases to a predetermined range or less (e.g., about 70 km or less). The present cooperative control may be performed while power saving intensity level 2 is in progress, and may be stopped when power saving intensity level 3 begins.

However, when the user manually operates an electronic convenience device which is a target of cooperative control, the cooperative control may be stopped, and the electronic convenience device may be operated depending on a setting of the user. The cooperative control is performed while power saving intensity level 2 is maintained, and may be stopped when the user manually operates the cooperative control target device. For example, the power supply to the fan heater is cut off by the power controller 140 and the cooperative control is performed so that the temperature of the seat heating wire or the steering wheel heating wire is increased, but when the user manually lowers the temperature of the seat heating wire or the steering wheel heating wire, the power controller 140 may stop the cooperative control. Accordingly, even when the cooperative control is stopped, power saving intensity level 2 may be maintained.

Figure 7:
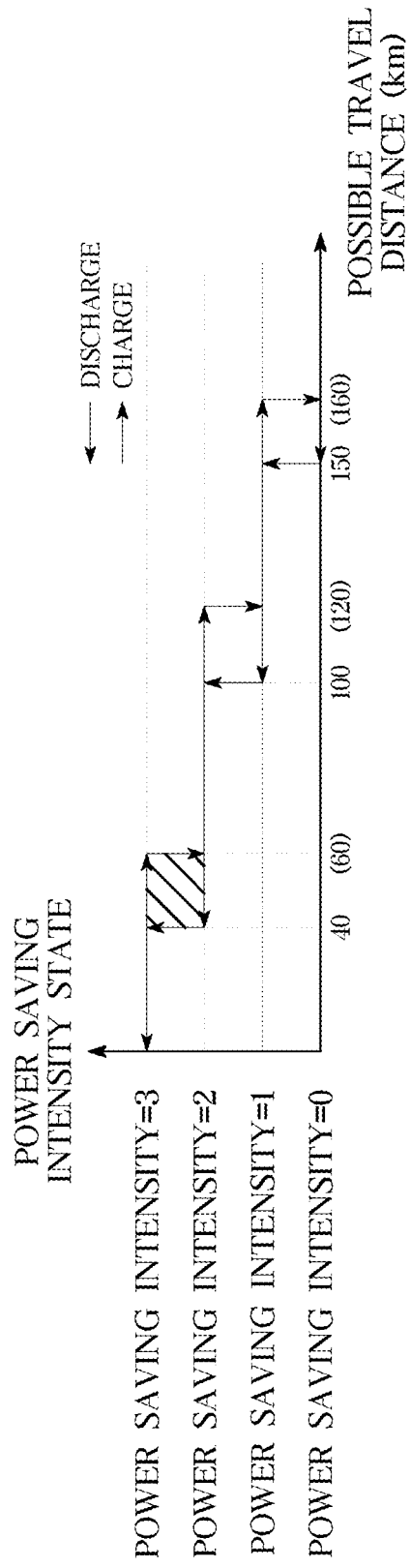
FIG. 7 is a diagram for explaining determination of execution and release of power saving intensity level 3 in the power saving control apparatus of the vehicle according to an exemplary embodiment of the present disclosure.
Figure 8:
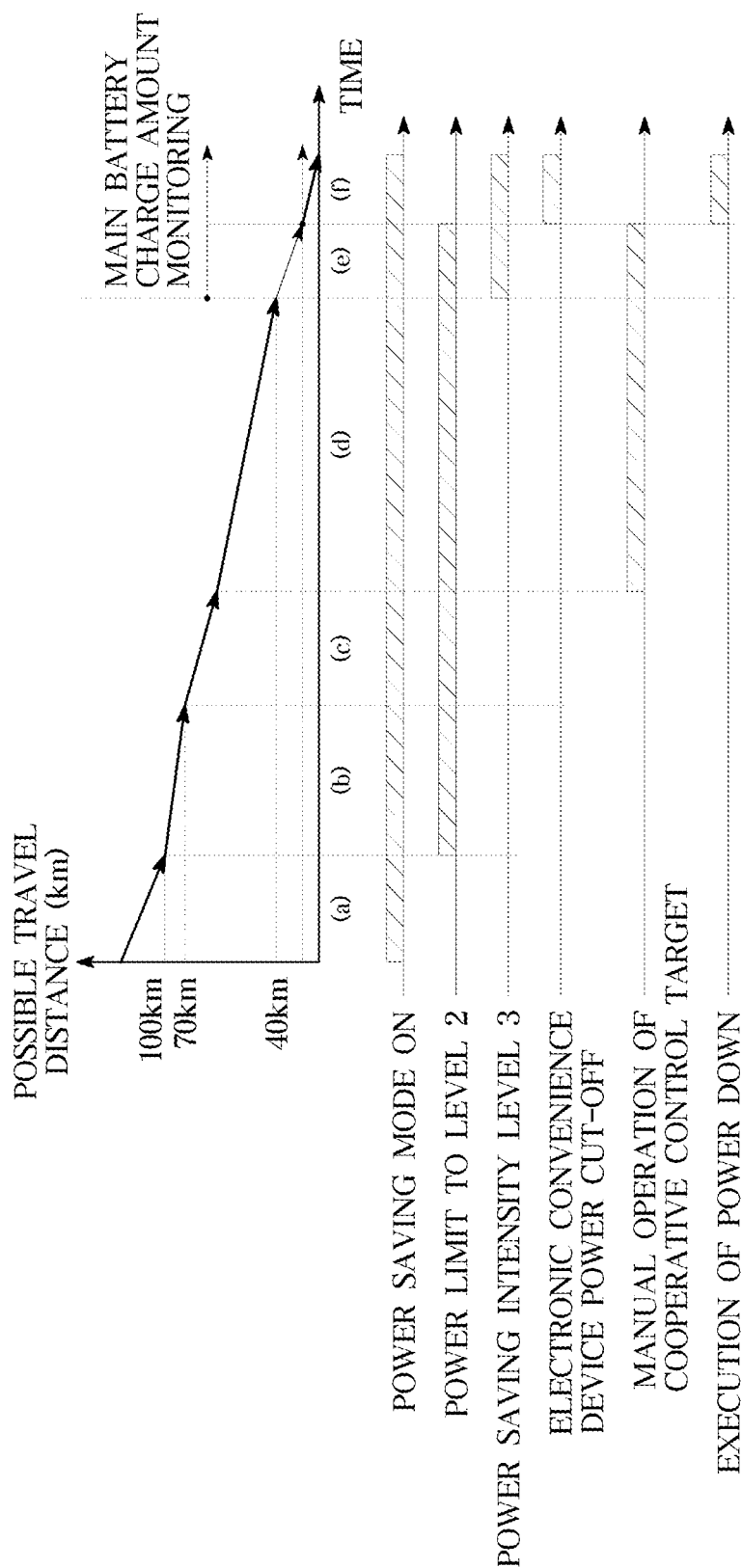
FIG. 8 is a diagram for explaining power control in power saving intensity level 3 in the power saving control apparatus of the vehicle according to an exemplary embodiment of the present disclosure.

As illustrated in FIG. 7, power saving intensity level 3 may begin when the possible travel distance is within the predetermined range (e.g., less than 40 km) regardless of whether the main battery is being charged or discharged, and may begin when power saving intensity level 2 is maintained.

Power saving intensity level 3 may be maintained when the possible travel distance increases to the predetermined range (e.g., 40 km to 60 km) while the main battery is being charged and released when the possible travel distance increases to a predetermined range or more (e.g., 60 km or more) while the main battery is being charged, and in the present way, power saving intensity level 2 may begin when the possible travel distance increases to the predetermined range or more.

When power saving intensity level 3 begins, the power controller 140 monitors the charge amount of the main battery while maintaining the limit of power consumption of the electronic convenience devices to 100% as in power saving intensity level 2. Therefore, in a case in which the cooperative control is performed in power saving intensity level 2 even when power saving intensity level 3 begins, the cooperative control may be equally performed in power saving intensity level 3, and also, in a case in which the user manually operates the cooperative control target device in power saving intensity level 2, the cooperative control may be equally performed in power saving intensity level 3.

By continuously monitoring the charge amount of the main battery in a state in which power saving intensity level 3 begins, the power controller 140 cuts off power for electronic convenience devices when the charge amount of the main battery is less than a predetermined value (e.g., less than 10%). In the present way, the power controller 140 may cut off power for the electronic convenience devices even though the user manually operates the electronic convenience devices when the charge amount of the main battery is less than the predetermined value.

The power controller 140 may request the drive controller 130 to drive the vehicle not to exceed a predetermined speed when the charge amount of the main battery is less than the predetermined value. That is, the power controller 140 may request the drive controller 130 to limit the speed of the vehicle, so that the charge amount of the main battery may be prevented from rapidly decreasing.

Accordingly, when the charge amount of the main battery decreases below the predetermined value, the power controller 140 may maximize the possible travel distance of the vehicle by consuming a minimum amount of power necessary for driving the vehicle.

Figure 9:
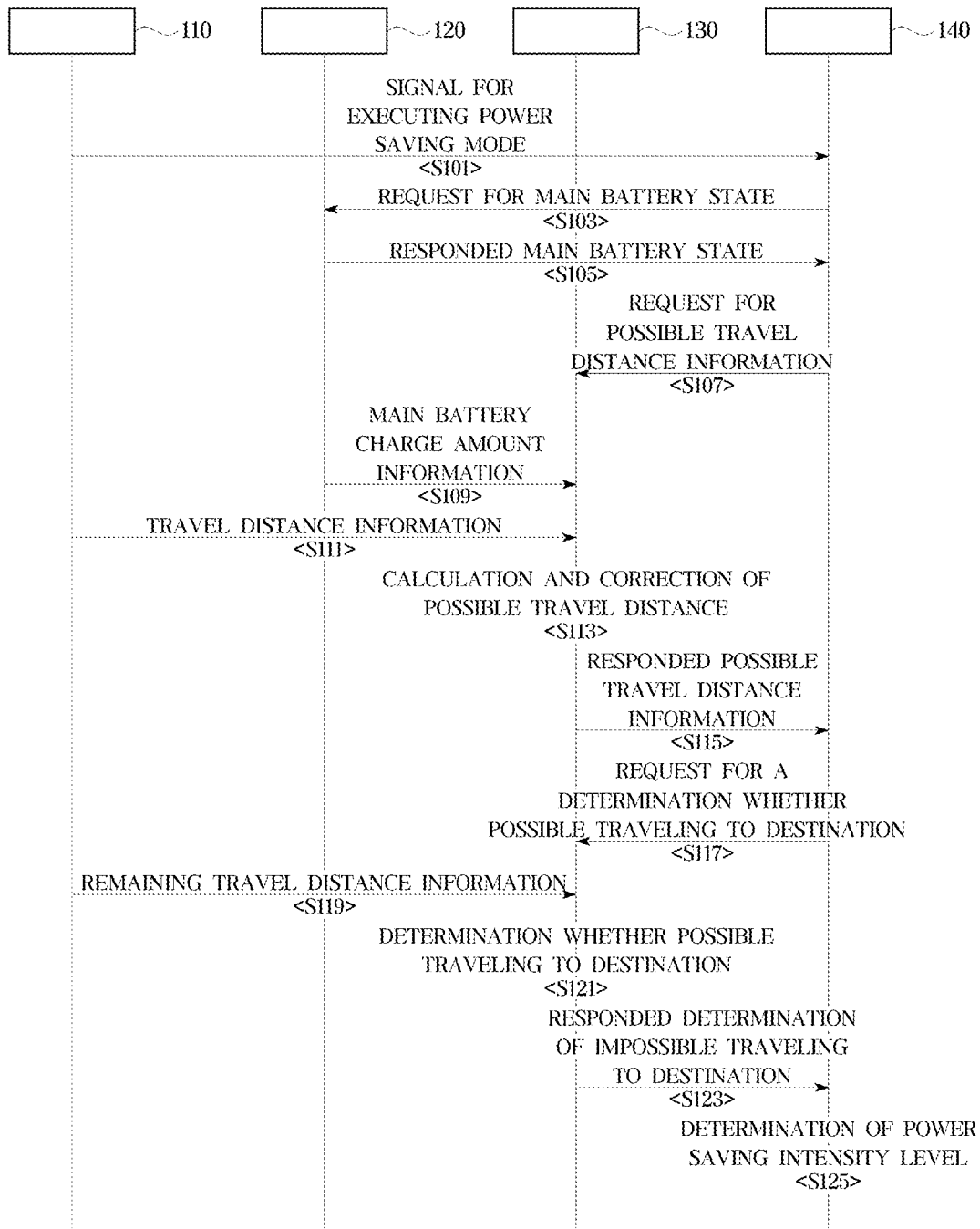
FIG. 9 is a flowchart for explaining a vehicle control method according to an exemplary embodiment of the present disclosure.

A vehicle control method according to an exemplary embodiment of the present disclosure will be described below with reference to FIG. 9. The vehicle control method according to an exemplary embodiment of the present disclosure is a method of controlling the vehicle to operate in the power saving mode, and FIG. 1 and FIG. 2 to 8 will be referred to when the vehicle control method according to an exemplary embodiment of the present disclosure is described.

A signal for executing the power saving mode is input to the power controller 140 (S101).

Information is input by the user through the input and output device 110 so that the vehicle executes the power saving mode. Accordingly, the signal for executing the power saving mode may be transmitted from the input and output device 110 to the power controller 140. The power saving mode may be executed by the user selecting the power saving mode or selecting a driving mode in the input and output device 110, or may be selected and executed together with the power saving mode in a process of recommending a route when the user utilizes a navigation function in the input and output device 110.

The power saving mode may be executed when the possible travel distance is equal to or greater than a predetermined distance (e.g., 150 km or greater) and the charge amount of the main battery is greater than or equal to a predetermined level (e.g., 50% or greater).

When the navigation function is executed in the input and output device 110 to recommend a route to the user, four recommendation methods may be exemplified as follows.

Firstly, route 1 may be exemplified as a recommended route in which the vehicle executes the power saving mode and preferentially travels the shortest distance, and for example, the input and output device 110 may display a guide indicating that the total travel distance is 200 km and it is possible for the vehicle to travel to the destination when the power saving mode is selected. In the instant case, the input and output device 110 may guide the remaining charge amount (e.g., 30%) of the main battery after traveling of the vehicle is finished, and guide the location of a charging station which may be used within a range of the remaining charge amount.

Secondly, route 2 may be exemplified as a recommended route in which the vehicle executes the power saving mode and preferentially travels on main roads and free roads, and for example, a guide indicating that the total travel distance is 260 km and it is possible for the vehicle to travel to the destination when the power saving mode is selected may display on the input and output device 110. In the instant case, the input and output device 110 may guide the remaining charge amount (e.g., 15%) of the main battery after traveling of the vehicle is finished, and guide the location of a charging station which may be used within a range of the remaining charge amount.

Thirdly, route 3 may be exemplified as a recommended route in which the vehicle passes through a slow charging station, and for example, together with a guide indicating that the total travel distance is 280 km and it is impossible for the vehicle to travel to the destination, a guide indicating that the vehicle passes through the slow charging station after traveling 200 km and then travels 80 km may display on the input and output device 110. Furthermore, a guide indicating that an expected arrival time increases by passing through the slow charging station may be together displayed on the input and output device 110.

Fourthly, route 4 may be exemplified as a recommended route in which the vehicle executes the power saving mode and passes through a fast charging station, and for example, the input and output device 110 may, together with a guide indicating that the total travel distance is 300 km and it is impossible for the vehicle to travel to the destination, display a guide indicating that the vehicle passes through the fast charging station after traveling 250 km and then travels 50 km. Furthermore, a guide indicating that an expected arrival time increases by passing through the fast charging station may be together displayed on the input and output device 110.

A state of the main battery is requested to the battery controller 120 (S103).

The power controller 140 transmits a request signal for checking the state of the main battery to the battery controller 120 when a signal for executing the power saving mode is received. The request for the state of the main battery is for checking whether the main battery is in the charged or discharged state.

A response to the state of the main battery is received (S105).

The power controller 140 receives a response to the charged and discharged state of the main battery from the battery controller 120. At the instant time, the power controller 140 receives information on an increase rate of the charge amount of the main battery from the battery controller 120, is configured to determine that the main battery is being charged when the increase rate of the charge amount of the main battery exceeds zero, and is configured to determine that the main battery is being discharged when the increase rate of the charge amount of the main battery is less than zero.

Information on the possible travel distance is requested to the drive controller 130 (S107).

The power controller 140 requests information on the possible travel distance of the vehicle to the drive controller 130. The possible travel distance is information on a distance that the vehicle may travel based on the charge amount of the main battery. That is, the possible travel distance may vary depending on fuel efficiency (km/kWh) of the vehicle and the charge amount (kWh) of the main battery.

Information on the charge amount of the main battery is received from the battery controller 120 (S109).

The drive controller 130 receives the information on the charge amount of the main battery from the battery controller 120 to determine the possible travel distance requested from the power controller 140 in step S107. In the instant case, the information on the charge amount of the main battery received from the battery controller 120 may be information on the current remaining charge amount. Herein, the present step may be a step in which the drive controller 130 receives the information on the charge amount of the main battery in response to a request for the information on the charge amount of the main battery to the battery controller 120.

Information on the travel distance is received from the input and output device 110 to (S111).

The drive controller 130 receives travel distance information from the input and output device 110 to determine the possible travel distance requested from the power controller 140 in step S107. In the instant case, the travel distance information may include the information on the fuel efficiency of the vehicle and information on an average power ratio (kW/km) according to an actual driving section. Herein, the present step may be a step in which the drive controller 130 receives the travel distance information in response to a request for the travel distance information to the input and output device 110.

The possible travel distance is determined and corrected by the drive controller (S113).

The drive controller 130 is configured to determine the possible travel distance using the information on the charge amount of the main battery received in step S109 and the travel distance information received in step S111. Furthermore, the drive controller 130 may correct the possible travel distance depending on average fuel efficiency depending on driving section included in the received travel distance information.

The possible travel distance information is responded (S115).

The drive controller 130 transmits the information on the possible travel distance to the power controller 140 in response to the request in step S107. The power controller 140 receives information on a current possible travel distance of the vehicle from the drive controller 130.

A determination of whether it is possible for the vehicle to travel to the destination is requested (S117).

When the information on the possible travel distance is received to the drive controller 130, the power controller 140 requests the drive controller 130 to determine whether it is possible for the vehicle to travel to the destination with the current possible travel distance.

Information on the remaining travel distance is received from the input and output device 110 (S119).

The drive controller 130 receives information on the remaining travel distance to the set destination from the input and output device 110. In the instant case, the input and output device 110 may be configured to determine a travel distance from a current location to a destination set by the user, and transmit the determined remaining travel distance to the drive controller 130. Herein, the present step may be a step in which the drive controller 130 receives the information on the remaining travel distance in response to a request to the input and output device 110 for the information on the remaining travel distance.

It is determined by the drive controller 130 whether or not it is possible for the vehicle to travel to the destination (S121).

The drive controller 130 is configured to determine whether it is possible for the vehicle to travel to the destination with a current charge amount of the main battery by comparing the information on the remaining travel distance received in step S119 and the possible travel distance determined in step S113.

The determination that it is impossible for the vehicle to travel to the destination is responded by the drive controller 130 (S123).

The power controller 140 receives a response from the drive controller 130 through step S121 that it is determined that it is impossible for the vehicle to travel to the destination. That is, the power controller 140 receives the determination from the drive controller 130 that it is impossible for the vehicle to travel to the destination with the current charge amount of the main battery.

Because when the drive controller 130 determines that it is possible for the vehicle to travel to the destination in step S121, the power controller 140 does not need to drive the vehicle in the power saving mode, when the determination that it is possible for the vehicle to travel to the destination is received in the present step, the power saving mode is not executed.

The power saving intensity level is determined by the power controller 140 (S125).

When a response to the determination that it is impossible for the vehicle to travel to the destination is received, the power controller 140 is configured to determine so that power saving intensity level 1, power saving intensity level 2, and power saving intensity level 3 are executed using the possible travel distance of the vehicle.

Power saving intensity level 1 may begin when the possible travel distance is within the predetermined range (e.g., in the range of 120 km to 150 km) regardless of whether the main battery is charged or discharged. Furthermore, when the possible travel distance decreases to the predetermined range (e.g., in the range of 100 km to 120 km) while the main battery is being discharged, power saving intensity level 1 may be maintained.

Power saving intensity level 1 may be released when the possible travel distance decreases to the predetermined range or more (e.g., less than 100 km) while the main battery is being discharged, and in the present way, when the possible travel distance decreases to the predetermined range or more, the power saving intensity level 2 may begin.

Power saving intensity level 1 may be maintained when the possible travel distance increases to the predetermined range (e.g., 150 km to 160 km) while the main battery is being charged, power saving intensity level 1 may be released when the possible travel distance increases to the predetermined range or more (e.g., 160 km or more) while the main battery is being charged, and in the present way, the power saving mode may be released when the possible travel distance increases to the predetermined range or more.

Herein, the possible travel distance may change as power saving intensity level 1 progresses, and thus to prevent repeated execution and release of the power saving mode or prevent repetition of user guidance for the execution and release of the power saving mode as the possible travel distance changes, a hysteresis section is set so that power saving intensity level 1 is maintained when the possible travel distance decreases to the predetermined range or increases to the predetermined range while the main battery is being discharged or charged. The hatched portions in FIG. 2 are the hysteresis sections.

In power saving intensity level 1, the power consumption of the electronic convenience devices, which are electronic equipment unrelated to driving and braking of the vehicle, is limited to be 50% at maximum. For example, when the power consumption of the electronic convenience devices is about 10 kW, the power consumption may be limited to the range of 5 kW to 9.5 kW.

As illustrated in FIG. 4, power saving intensity level 2 may begin when the possible travel distance is within the predetermined range (e.g., 60 km to 100 km) regardless of whether the main battery is being charged or discharged. Furthermore, when the possible travel distance decreases to the predetermined range (e.g., 40 km to 60 km) while the main battery is being discharged, power saving intensity level 2 may be maintained.

When the possible travel distance decreases to the predetermined range or more than (e.g., less than 40 km) while the main battery is being discharged, power saving intensity level 2 may be released, and in the present way, when the possible travel distance decreases to the predetermined range or more, power saving intensity level 3 may begin.

Power saving intensity level 2 may be maintained when the possible travel distance increases to the predetermined range (e.g., 100 km to 120 km) while the main battery is being charged, power saving intensity level 2 may be released when the possible travel distance increases to the predetermined range or more (e.g., 120 km or more) while the main battery is being charged, and in the present way, power saving intensity level 1 may begin when the possible travel distance increases to the predetermined range or more.

Herein, the possible travel distance may change as power saving intensity level 2 progresses, and thus to prevent the power saving intensity level from changing to level 1 or level 3 or prevent repetition of user guidance for the change of the power saving intensity level as the possible travel distance changes, a hysteresis section is set so that power saving intensity level 2 is maintained when the possible travel distance decreases to the predetermined range or increases to the predetermined range while the main battery is being discharged or charged. The hatched portions in FIG. 4 are the hysteresis sections.

In power saving intensity level 2, the power consumption of the electronic convenience devices unrelated to driving and braking of the vehicle is limited to be 100% at maximum. For example, when the power consumption of the electronic convenience devices is about 10 kW, the power consumption may be limited to the range of 0.5 kW to 5 kW.

The power controller 140 is configured to control so that power saving intensity level 3 begins when the main battery is discharged and the possible travel distance decreases to the predetermined range or more (e.g., less than 40 km). That is, when the user manually operates the electronic convenience devices, the power saving mode is released, and when the condition for beginning power saving intensity level 3 is satisfied, power saving intensity level 3 may begin immediately.

As illustrated in FIG. 6, as needed, the cooperative control may be performed in power saving intensity level 2.

As illustrated in FIG. 7, power saving intensity level 3 may begin when the possible travel distance is within the predetermined range (e.g., less than 40 km) regardless of whether the main battery is being charged or discharged, and may begin when power saving intensity level 2 is maintained.

Power saving intensity level 3 may be maintained when the possible travel distance increases to the predetermined range (e.g., 40 km to 60 km) while the main battery is being charged and released when the possible travel distance increases to the predetermined range or more (e.g., 60 km or more) while the main battery is being charged, and in the present way, power saving intensity level 2 may begin when the possible travel distance increases to the predetermined range or more.

When power saving intensity level 3 begins, the power controller 140 monitors the charge amount of the main battery while maintaining the limit of the power consumption of the electronic convenience devices to 100% as in power saving intensity level 2. Therefore, in the case in which the cooperative control is performed in power saving intensity level 2 even when power saving intensity level 3 begins, the cooperative control may be equally performed in power saving intensity level 3, and also, in the case in which the user manually operates the cooperative control target device in power saving intensity level 2, the cooperative control may be equally performed in power saving intensity level 3.

By continuously monitoring the charge amount of the main battery in the state in which power saving intensity level 3 begins, the power controller 140 cuts off power for the electronic convenience devices when the charge amount of the main battery is less than the predetermined value (e.g., less than 10%). In the present way, the power controller 140 may cut off power for the electronic convenience devices even though the user manually operates the electronic convenience devices when the charge amount of the main battery is less than the predetermined value.

The power controller 140 may request the drive controller 130 to drive the vehicle not to exceed the predetermined speed when the charge amount of the main battery is less than the predetermined value. That is, the power controller 140 may request the drive controller 130 to limit the speed of the vehicle, so that the charge amount of the main battery may be prevented from rapidly decreasing.

Figure 10:
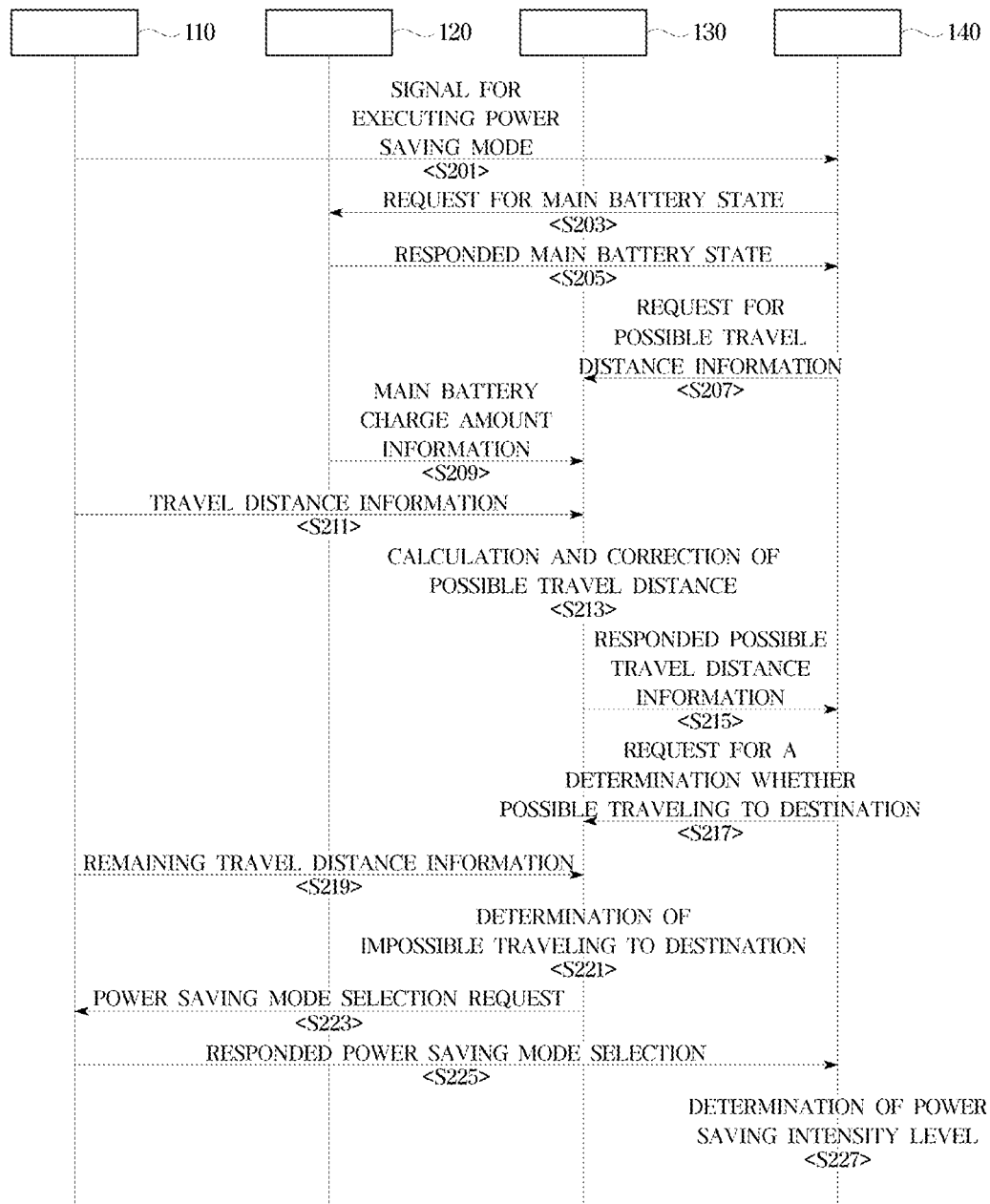
FIG. 10 is a flowchart for explaining a modified example of the vehicle control method according to an exemplary embodiment of the present disclosure.

A modified example of the vehicle control method according to an exemplary embodiment of the present disclosure will be described below with reference to FIG. 10. The vehicle control method according to an exemplary embodiment of the present disclosure is a method of controlling the vehicle to operate in the power saving mode, and the same contents as those described with reference to FIG. 9 will be omitted when the modified example of the vehicle control method according to an exemplary embodiment of the present disclosure is described.

Steps S201, S203, S205, S207, S209, S211, S213, S215, S217, S219 and S221 in the modified example of an exemplary embodiment of the present disclosure are the same as steps S101, S103, S105, S107, S109, S111, S113, S115, S117, S119 and S121 of the vehicle control method according to an exemplary embodiment of the present disclosure, and thus a description thereof will be omitted.

A power saving mode selection is requested (S223).

The drive controller 130 requests the input and output device 110 to select the power saving mode when it is determined that it is impossible for the vehicle to travel to the destination in step S221. Accordingly, the input and output device 110 outputs a screen so that the user may select the power saving mode. The input and output device 110 may display information indicating that it is impossible for the vehicle to travel to the destination and requesting the user to select and drive in the power saving mode. In the instant case, information on whether it is possible for the vehicle to travel to the destination or information on a change in the possible travel distance when driving in the power saving mode may be together displayed on the input and output device 110 as needed.

A response to the power saving mode selection is received from the input and output device 110 (S225).

The power controller 140 receives information on use of the power saving mode by the user from the input and output device 110.

The power controller 140 proceeds the next step when receiving information related to executing the power save mode depending on a selection of the user, and finishes the process of executing the power saving mode when receiving information related to not executing the power saving mode.

The power saving intensity level is determined by the power controller 140 (S227).

When the response to the determination that it is impossible for the vehicle to travel to the destination is received, the power controller 140 is configured to determine so that power saving intensity level 1, power saving intensity level 2, and power saving intensity level 3 are executed using the possible travel distance of the vehicle. Because the present step is the same as step S125, a detailed description thereof will be omitted.

As is apparent from the above, according to an exemplary embodiment of the present disclosure, a possible travel distance of a vehicle may be increased by adjusting power consumption of electronic convenience devices included in the vehicle depending on possible travel distance of the vehicle.

Furthermore, power consumption of the electronic convenience devices unrelated to driving and braking of the vehicle may be adjusted by adjusting a power saving mode to three levels depending on possible travel distance of the vehicle, and driving may be controlled to maximize the possible travel distance of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control method comprising:
   receiving, by a power controller, information on a state of a battery from a battery controller so that a vehicle operates in a power saving mode;
   receiving, by the power controller, information on a possible travel distance of the vehicle determined by a drive controller using information on a charge amount of the battery;
   receiving, by the power controller, information on determination that the vehicle cannot travel to a destination, the information on determination being generated by the drive controller using information on a remaining travel distance to the destination; and
   executing, by the power controller, the power saving mode depending on a level according to the information on the determination that the vehicle cannot travel to the destination,
   wherein the level of the power saving mode includes:
      power saving intensity level 1 for limiting power by setting power consumption of an electronic convenience device to a predetermined value; and
      power saving intensity level 2 for cutting off the power consumption of the electronic convenience device;
   wherein a cooperative control is performed while the power saving intensity level 2 is maintained, and
   wherein in the cooperative control, a cooperative control target device is operated, wherein the cooperative control target device includes the electronic convenience device that consumes relatively lower power than an operating electronic convenience device and replaces the operating electronic convenience device.

2. The vehicle control method of claim 1, wherein the electronic convenience device is a device unrelated to driving and braking of the vehicle.

3. The vehicle control method of claim 1, wherein the level of the power saving mode further includes:
   power saving intensity level 3 for monitoring the charge amount of the battery and controlling driving of the vehicle depending on the charge amount of the battery.

4. The vehicle control method of claim 3, wherein the power saving intensity level 1 begins when the possible travel distance of the vehicle is within a first range, and is maintained when the possible travel distance of the vehicle decreases to a first reduction range smaller than the first range while the battery is being discharged or when the possible travel distance of the vehicle increases to a first increase range larger than the first range while the battery is being charged.

5. The vehicle control method of claim 4, wherein the power saving intensity level 2 begins when the possible travel distance of the vehicle decreases to the first reduction range or more while the battery is being discharged.

6. The vehicle control method of claim 3, wherein the power saving intensity level 2 begins when the possible travel distance of the vehicle is within a second range, and is maintained when the possible travel distance of the vehicle decreases to a second reduction range smaller than the second range while the battery is being discharged or when the possible travel distance of the vehicle increases to a second increase range larger than the second range while the battery is being charged.

7. The vehicle control method of claim 6, wherein the power saving intensity level 3 begins when the possible travel distance of the vehicle is within a third range.

8. The vehicle control method of claim 3, wherein the power saving mode is released when the electronic convenience device is manually operated while one of the power saving intensity level 1 and the power saving intensity level 2 is being executed.

9. The vehicle control method of claim 3, wherein in the power saving intensity level 3, a vehicle speed is limited when the charge amount of the battery decreases to a predetermined range or less.

10. The vehicle control method of claim 1, wherein the cooperative control is stopped when the cooperative control target device is manually operated.

11. The vehicle control method of claim 1, wherein in the power saving intensity level 3, the cooperative control is performed depending on the charge amount of the battery.

12. A vehicle comprising:
   an input and output device including navigation information and through which information is input or output by a user;
   a battery controller configured to control a battery provided to supply power to the vehicle;
   a drive controller configured to control driving of the vehicle and to determine a possible travel distance using information on a charge amount of the battery and travel distance information; and
   a power controller configured to execute a power saving mode for controlling power consumed by an electronic convenience device included in the vehicle depending on a level using the possible travel distance,
   wherein the level of the power saving mode includes:
      power saving intensity level 1 for limiting power by setting power consumption of the electronic convenience device to a predetermined value; and
      power saving intensity level 2 for cutting off the power consumption of the electronic convenience device;
   wherein a cooperative control is performed while the power saving intensity level 2 is maintained, and
   wherein in the cooperative control, a cooperative control target device is operated, wherein the cooperative control target device includes the electronic convenience device that consumes relatively lower power than an operating electronic convenience device and replaces the operating electronic convenience device.

13. The vehicle of claim 12, wherein the level of the power saving mode includes:
   power saving intensity level 3 for monitoring the charge amount of the battery and controlling driving of the vehicle depending on the charge amount of the battery.

14. The vehicle of claim 13, wherein the power saving intensity level 1 begins when the possible travel distance of the vehicle is within a first range, and is maintained when the possible travel distance of the vehicle decreases to a a first reduction range smaller than the first range while the battery is being discharged or when the possible travel distance of the vehicle increases to a first increase range larger than the first range while the battery is being charged.

15. The vehicle of claim 13, wherein the power saving intensity level 2 begins when the possible travel distance of the vehicle is within a second range, and is maintained when the possible travel distance of the vehicle decreases to a second reduction range smaller than the second range while the battery is being discharged or when the possible travel distance of the vehicle increases to a second increase range larger than the second range while the battery is being charged.

16. The vehicle of claim 13, wherein the power saving mode is released when the electronic convenience device is manually operated while one of the power saving intensity level 1 and the power saving intensity level 2 is being executed.

17. The vehicle of claim 13, wherein in the power saving intensity level 3, a vehicle speed is limited when the charge amount of the battery decreases to a predetermined range or less.

* * * * *